(12) United States Patent
Badis et al.

(10) Patent No.: US 11,802,474 B2
(45) Date of Patent: Oct. 31, 2023

(54) FORMATION-CUTTING ANALYSIS SYSTEM FOR DETECTING DOWNHOLE PROBLEMS DURING A DRILLING OPERATION

(71) Applicant: Landmark Graphics Corporation, Houston, TX (US)

(72) Inventors: Chafaa Badis, Lons (FR); Welton Souza, Dan Haag (NL); Perminder Sabharwal, London (GB); Muhammad Yasir, Quetta (PK)

(73) Assignee: Landmark Graphics Corporation, Houston, TX (US)

( * ) Notice: Subject to any disclaimer, the term of this patent is extended or adjusted under 35 U.S.C. 154(b) by 203 days.

(21) Appl. No.: 17/334,177

(22) Filed: May 28, 2021

(65) Prior Publication Data

US 2022/0381132 A1 Dec. 1, 2022

(51) Int. Cl.
| | |
|---|---|
| *E21B 47/002* | (2012.01) |
| *G01V 8/00* | (2006.01) |
| *G08B 21/18* | (2006.01) |
| *G06T 7/00* | (2017.01) |

(52) U.S. Cl.
CPC ............. *E21B 47/002* (2020.05); *G01V 8/00* (2013.01); *G06T 7/0004* (2013.01); *G08B 21/18* (2013.01); *E21B 2200/20* (2020.05); *G06T 2207/20081* (2013.01); *G06T 2207/30164* (2013.01)

(58) Field of Classification Search
CPC ..... E21B 47/002; E21B 2200/20; G01V 8/00; G06T 7/0004; G06T 2207/20081; G06T 2207/30164; G08B 21/18
See application file for complete search history.

(56) References Cited

U.S. PATENT DOCUMENTS

| | | | |
|---|---|---|---|
| 2014/0333754 A1* | 11/2014 | Graves | E21B 47/002 348/85 |
| 2016/0130928 A1* | 5/2016 | Torrione | E21B 49/005 700/275 |
| 2017/0058620 A1 | 3/2017 | Torrione | |
| 2017/0089153 A1 | 3/2017 | Teodorescu | |
| 2017/0161885 A1 | 6/2017 | Parmeshwar et al. | |

FOREIGN PATENT DOCUMENTS

WO 2019160859 8/2019

OTHER PUBLICATIONS

PCT Application No. PCT/US2021/035208, International Search Report and Written Opinion, dated Feb. 23, 2022, 10 pages.

* cited by examiner

*Primary Examiner* — Crystal J. Lee
(74) *Attorney, Agent, or Firm* — Kilpatrick Townsend & Stockton LLP

(57) ABSTRACT

A system is disclosed for detecting a problem associated with a drilling operation based on the properties of a formation cutting. The system can include a camera for generating an image of the formation cutting extracted from a subterranean formation. The system can include one or more sensors for detecting one or more characteristics of the subterranean formation or a well tool. The system can provide the image as input to a first model for determining one or more properties of the formation cutting based on the image. The system can provide the one or more properties and the one or more characteristics as input to a second model for detecting a downhole problem associated with the drilling operation. The system can transmit an alert indicating the downhole problem and optionally a recommended solution to a user.

20 Claims, 5 Drawing Sheets

FORMATION-CUTTING ANALYSIS SYSTEM FOR DETECTING DOWNHOLE PROBLEMS DURING A DRILLING OPERATION

TECHNICAL FIELD

The present disclosure relates generally to the field of well drilling operations and, more particularly (although not necessarily exclusively), to formation cutting analysis during well drilling operations.

BACKGROUND

During a downhole drilling process, separation tools can be used on a drilling rig to separate formation cuttings from drilling fluid, such as drilling mud. Such cuttings are bits of solid material removed from a borehole during the drilling process and circulated to the well surface in the drilling mud. The cuttings can have different shapes, sizes, volumes, and materials depending on various factors, such as the layer of the subterranean formation being drilled and the characteristics of the downhole environment. After the drilling mud carries the formation cuttings to the surface of the wellbore, the drilling mud can pass through a separation tool such as a shaker and overflow into a drain. One example of a shaker is a shale shaker, which can be used at the rig surface to separate formation cuttings from drilling mud. In a shale shaker, formation cuttings are carried across a shaker belt of a shaker screen and the drilling mud can flow into a mud tank where it can be further treated.

DETAILED DESCRIPTION

Figure 1:
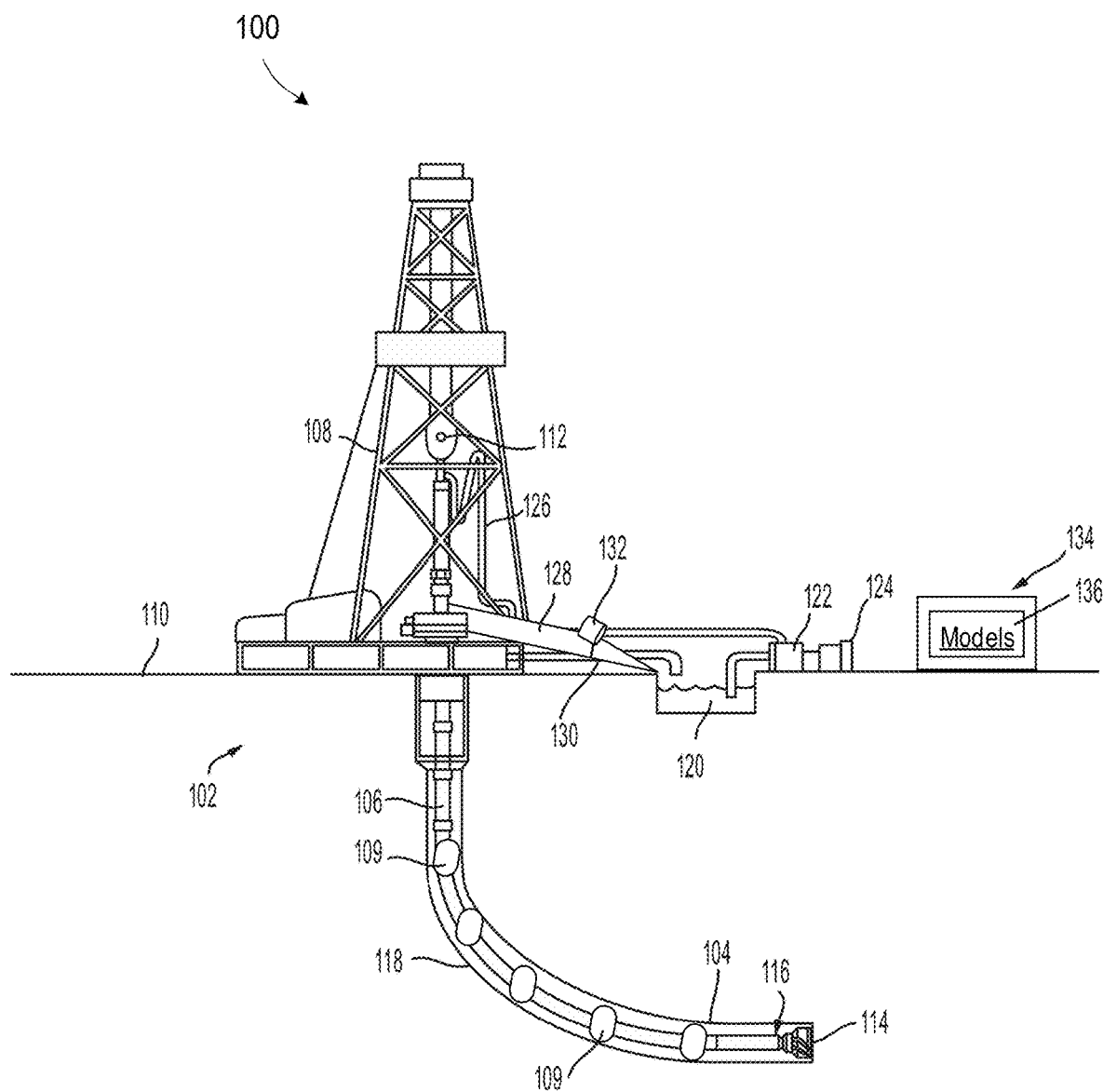
FIG. 1 is a schematic diagram of a drilling rig in which a system to analyze formation cuttings can be implemented according to one example of the present disclosure.

Certain aspects and examples of the present disclosure relate to a system that can use multiple models to analyze (e.g., in real-time) formation cuttings extracted from a subterranean formation during a drilling operation to identify problems downhole. During the drilling operation, the formation cuttings can be circulated to the well surface in a drilling fluid and then pass along a shaker belt of a shale shaker. The system can include a camera oriented towards the shaker belt for generating images of the formation cuttings on the shaker belt. The system can also include other sensors, which may be positioned downhole or at the well surface, to provide additional information (e.g., real-time data) about the subterranean formation or a well tool associated with the drilling operation. The system can provide the images and the additional information from the sensors to the models, which can automatically detect a problem associated with the drilling operation downhole. The system can then output an alert about the problem to a well operator. In some examples, the system may also output a recommendation to the well operator about how to correct the problem.

The characteristics of formation cuttings from the subterranean formation, in conjunction with information from the well tools used during the drilling operation, can indicate problems occurring downhole during the drilling operation. A human expert usually has to be at the wellsite looking at these cuttings, recording their shapes and sizes, and manually analyzing the cuttings to detect these problems. This manual analysis can be subjective, slow, error prone, and require significant expertise. Furthermore, there is not an effective way of acquiring additional information, provided separately from the cuttings, to corroborate these manual analyses indicating problems downhole. Some examples of the present disclosure can automate the process of analyzing cuttings (e.g., in real-time) for downhole problems to make the process of analyzing faster, easier, and more precise. In some examples, the automated system for analyzing cuttings can streamline acquiring data from multiple sources of the wellsite and implement analytical models that readily identify and weigh the data to determine problems. In some examples, the automated process can use images as well as sensor data (e.g., real-time sensor data) to improve accuracy. The automated process can also use machine-learning to train and improve the analytical models, further aiding in precision and accuracy of the models. These improvements can help to better detect and mitigate problems during drilling operations.

More specifically, formation cuttings can be split from the subterranean formation during a drilling operation in a way that impacts well stability and may lead to a collapse of the wellbore, among other problems. To detect and avoid such problems, some examples of the present disclosure include a system that is configured to automatically analyze the formation cuttings. The system can include a camera, a laser, or both oriented toward a shaker belt of a shale shaker. Formation cuttings and the mud that remains on the cuttings can be separated in the shale shaker using the shaker belt and a shaker screen. The camera and laser can image the cutting and other measurements of the cutting to be analyzed. The information can be provided to a computing device that can be communicatively coupled to the camera and laser. The computing device can determine properties of the cuttings based on the information from the camera and the laser. The computing device can use the detected properties of the formation cuttings to detect one or more downhole problems. In some examples, the computing device can also be coupled to one or more downhole sensors configured to detect characteristics of the subterranean formation or the characteristics of one or more well tools. This additional information can be fed into the computing device, which can use this additional information in detecting the one or more downhole problems.

In some examples, the system can include three software models for receiving and analyzing data to detect a downhole problem. The models can be machine-learning models that can be trained with training data. Examples of the machine-learning models can include neural networks and classifiers. The models can have different inputs and outputs and may be ordered sequentially such that outputs from one model can feed into a subsequent model. For example, the system can receive an image from the camera depicting a formation cutting on the shaker belt. The system can provide the image as input to a first model. The first model can be configured as an object detection model that can detect a boundary of the cutting. In some examples, the first model can use segmentation image processing techniques for object detection. The first model can detect the formation cutting on the shaker belt, determine properties of the formation cutting, and output the properties of the formation cutting. Examples of the properties can include a perimeter, type (class), volume, and/or material of the individual cutting. The system can also receive sensor data from one of the downhole sensors indicating a characteristic of the subterranean formation or a characteristic of a well tool. Examples of sensor data can include true resistivity (RT) wireline data, gamma ray (GR) wireline data, or both. Furthermore, the system can receive additional measurements or features of the cutting (e.g. shape, edges) on the shaker belt via the laser. The system can then provide the properties of the formation cutting, the additional measurements of the cutting, and the characteristic of the subterranean formation or the well as inputs to a second model. The second model can be configured as a problem identification model. The second model can analyze the inputs to detect a downhole problem and output the downhole problem. The system can then provide the downhole problem as input to a third model. In some examples, the third model can be configured as a recommendation model. The third model can analyze the downhole problem and output a recommended solution. In some examples, the third model can include a lookup table that can correlate a downhole problem to solutions, to recommend a solution based on the downhole problem.

In some examples, the camera of the system can include an internal processing device configured to execute the abovementioned models to detect one or more problems downhole. In this way, the processing and problem detection can be performed inside the camera itself (e.g., rather than using a remote cloud application). The internal processing and detection of the camera can be based on the camera's detection and image capture capability, the image itself, or a combination of these. Furthermore, the internal processing device of the camera may include analyzing or machine-learning capabilities. For example, an image resolution of the image can be improved using machine-learning. In one example of the present disclosure, the camera can generate three-dimensional (3D) visualizations of the cutting using a trained machine-learning model. Having the processing and problem detection occur inside the camera at the wellsite, rather than at a remote location such as a cloud computing environment, can reduce latency and increase the speed at which downhole problems are detected. In other examples, the system can include a processing device that is separate from the camera to execute the abovementioned models for detecting one or more problems downhole. The processing device may still be located at the wellsite, though, to reduce latency and increase the speed at which downhole problems are detected. The processing device (e.g. of the camera) may be a device specifically configured for executing machine-learning models and can interface with an edge device at the wellsite to analyze the formation cuttings more rapidly.

In some examples, the system can also use the models to detect the presence of foreign objects, damage to the screen, mud overflow, or other undesirable conditions occurring with respect to the shaker. For example, the first model can be trained using images where overflow is occurring on a shaker to detect an overflow condition involving mud overflowing in the shale shaker. Additionally or alternatively, the first model can be trained using images where the screen of the shaker has holes or tears to detect a damage condition involving damage to the screen of the shale shaker.

In some examples, there can be additional cameras or sensors to aid in detecting properties of the cutting. For example, at least two cameras can be used for detecting a distance that can be used to determine a height or volume of the cutting. Additionally or alternatively, a laser can be included to measure a height or distance in the cutting. In some examples, the image may contain metadata properties, which may be used by the first model for determining some or all of the properties of the cutting. Examples of such metadata include size or dimension properties, or color or light properties, associated with the image.

In some examples, the system can create three-dimensional (3D) models of content on the shaker based on images from the cameras. The 3D models may be included in a virtual reality environment or augmented reality environment generated by the system. For example, the system can use one or more computer vision algorithms and/or one or more machine learning algorithms to generate the 3D models based on images from two or more cameras. The 3D models can demonstrate the shale shaker conditions at various points in time to a user of the system. The user may be able to view the 3D models on a display such as a computer monitor or a virtual reality headset, for example as part of a virtual reality environment or an augmented reality environment. The user may use the 3D models to analyze the state of the shale shaker or the content of the shale shaker from a remote location (e.g., offsite or otherwise at a location that is remote to the shale shaker).

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic diagram of a drilling rig 100 in which a system to analyze formation cuttings can be implemented according to one example of the present disclosure. The drilling rig 100 can be a wellsite at which the wellbore 118 is formed. In some examples, the wellbore 118 can be used to extract hydrocarbons from a subterranean formation 102. The wellbore 118 can be drilled using a drilling system. The drilling system may drive a bottom hole assembly (BHA) 104 positioned or otherwise arranged at the bottom of a drill-string 106 extended into the subterranean formation 102 from a derrick 108 arranged at the surface 110. The derrick 108 can include a kelly 112 used to lower and raise the drill-string 106.

The BHA 104 may include a drill bit 114 operatively coupled to a tool string 116, which may be moved axially within a drilled wellbore 118 as attached to the drill-string 106. The tool string 116 may include one or more sensors 109 for determining conditions in the wellbore 118. The sensors 109 may be part of a measurement unit that may be deployable downhole in the wellbore 118 and may sense data relating to drilling conditions, including characteristics of a well tool or the subterranean formation, or any other suitable downhole data. Examples of the sensors 109 can include a weight-on-bit sensor, a revolutions-per-minute sensor, a pressure sensor, temperature sensor, or another suitable sensor. In some examples, the sensors 109 can be disposed downhole in the wellbore 118, at the surface 110, a combination thereof, or in any other suitable location for detecting a characteristic of the wellsite, including a characteristic of the well tool or the subterranean formation. The measurement unit can transmit the characteristics to a computing device 134 that can be positioned at the surface 110 or in other suitable locations. The combination of any support structure (in this example, the derrick 108), any motors, electrical equipment, and support for the drill-string and tool string may be referred to herein as a drilling arrangement.

During operation, the drill bit 114 penetrates the subterranean formation 102 to create the wellbore 118. The BHA 104 can control the drill bit 114 as the drill bit 114 advances into the subterranean formation 102. The combination of the BHA 104 and the drill bit 114 can be referred to as a drilling tool. Fluid or "mud" from a mud tank 120 may be pumped downhole using a mud pump 122 powered by an adjacent power source, such as a prime mover or motor 124. The mud may be pumped from the mud tank 120, through a stand pipe 126, which feeds the mud into the drill-string 106 and conveys the mud to the drill bit 114. The mud exits one or more nozzles (not shown) arranged in the drill bit 114 and thereby cools the drill bit 114. After exiting the drill bit 114, the mud circulates back to the surface 110 via the annulus defined between the wellbore 118 and the drill-string 106, thereby carrying the formation cuttings and debris to the surface 110. The cuttings and mud mixture are passed through a flow line 128 and are processed such that a cleaned mud is returned down hole through the stand pipe 126 once again. The cuttings and the mud that remains on the cuttings can be separated in a shaker 130 (e.g., a shale shaker) after being passed through the flow line 128.

The shaker 130 can include a camera 132, laser, or both for acquiring data to analyze the cuttings. As the cuttings pass across the shaker 130, the camera 132 and laser can provide data about the cuttings to the computing device 134, which can operate models 136 for analyzing the cuttings. The sensors 109 can also provide additional data to the computing device 134, for example in real time as the formation cuttings pass across the shaker 130. The computing device 134 can provide some or all of this data as input to the models 136 for analyzing the formation cuttings in real time as they cross the shaker 130. Additional details about the shaker 130 and computing device 134 are described below with respect to FIG. 2.

Figure 2:
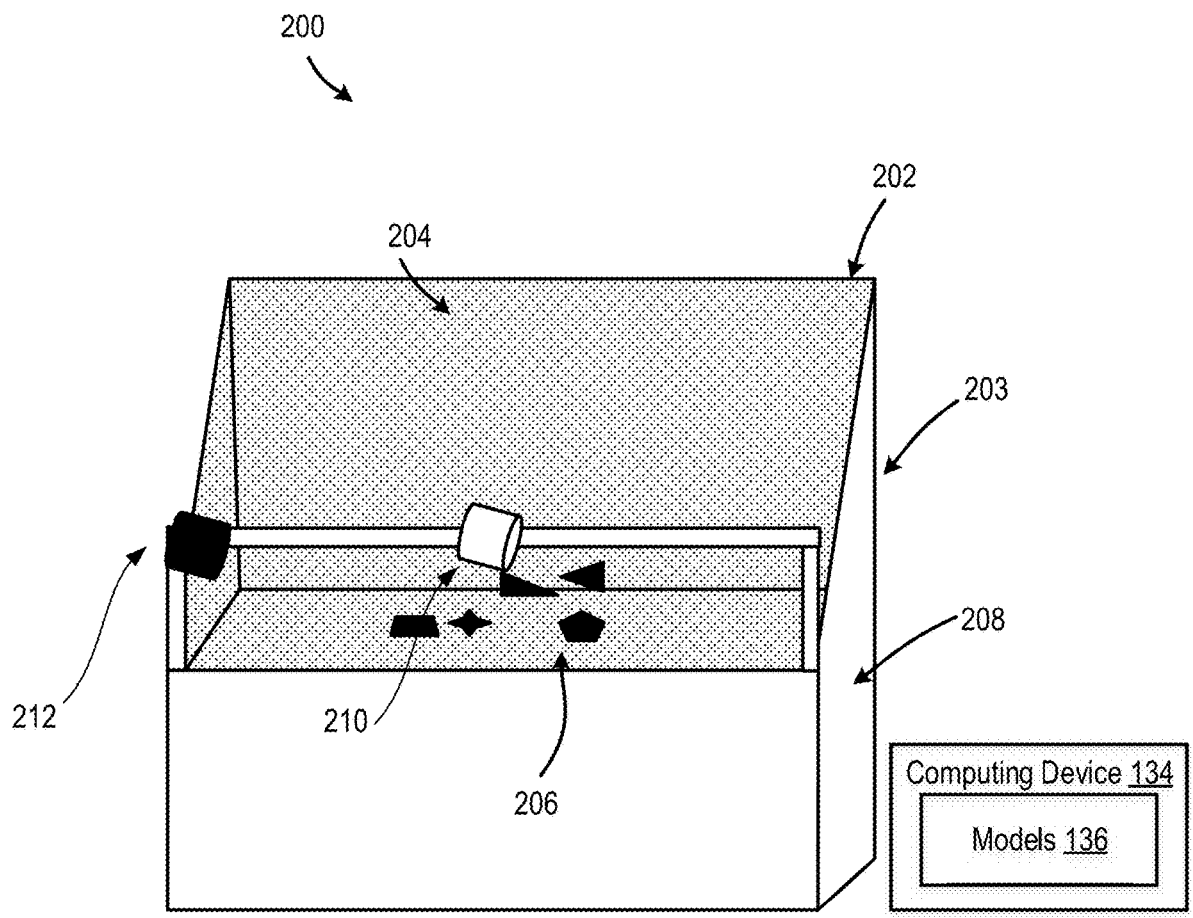
FIG. 2 is a perspective view of an example of a system for analyzing formation cuttings on a shale shaker according to one example of the present disclosure.

FIG. 2 is a perspective view of an example of a system 200 for analyzing formation cuttings on a shaker 203 such as a shale shaker according to one example of the present disclosure. The system 200 can include the shaker belt 202, the shaker screen 204, one or more cameras 210, and one or more lasers 212. The cameras 210 and the lasers 212 can be physically attached to the shaker 203 and oriented toward the shaker belt 202. The shaker 203 can be similar to the shaker 130 of FIG. 1. The shaker belt 202 and the shaker screen 204 can be used to separate mud from cuttings 206. A cutting 206 can be of a certain size, shape, material, and volume.

The cameras 210 can be used for detecting and capturing one or more images of the formation cuttings. In some examples, the camera 210 can generate a 3D image of the cutting 206 using machine-learning. The camera 210 can be an infrared camera or a self-centering zooming camera, and the camera 210 can include illumination. In some examples, the multiple cameras 210 can be used for detecting a height or volume, or other measurements of the cutting 206.

In some examples, the lasers 212 can use pulse ranging technology for detecting a height or other measurements of the cutting 206. The lasers 212 can be separate from the camera 210 and can be different from the other downhole and surface sensors for detecting properties of the cutting 206.

In some examples, the camera 210 and laser 212 can be communicatively coupled via a wired or wireless interface to a separate computing device 134, to which they can provide the detected image of the cutting 206 and detected measurements of the cutting 206 during the drilling operation. The computing device 134 can then operate models 136 for analyzing the data provided by the cameras 210 and the lasers 212 to detect one or more downhole problems.

In some examples, the cameras 210 and lasers 212 can provide additional information to the computing device 134. One example of additional information can include metadata about the image. This additional information can be used by the computing device 134 in detecting properties of the formation cuttings 206.

In some examples, the shaker screen 204 may be damaged or the retained mud that flows onto the shaker belt 202 may overflow from the shaker. These issues can affect the performance of the shaker 203. So, in some examples the computing device 134 can detect and notify an operator about these undesirable conditions by analyzing images from the camera 210 and optionally data from the laser 212. Notifying the operator about these conditions may allow for them to be corrected or mitigated to improve the performance of the shaker 203.

Figure 3:
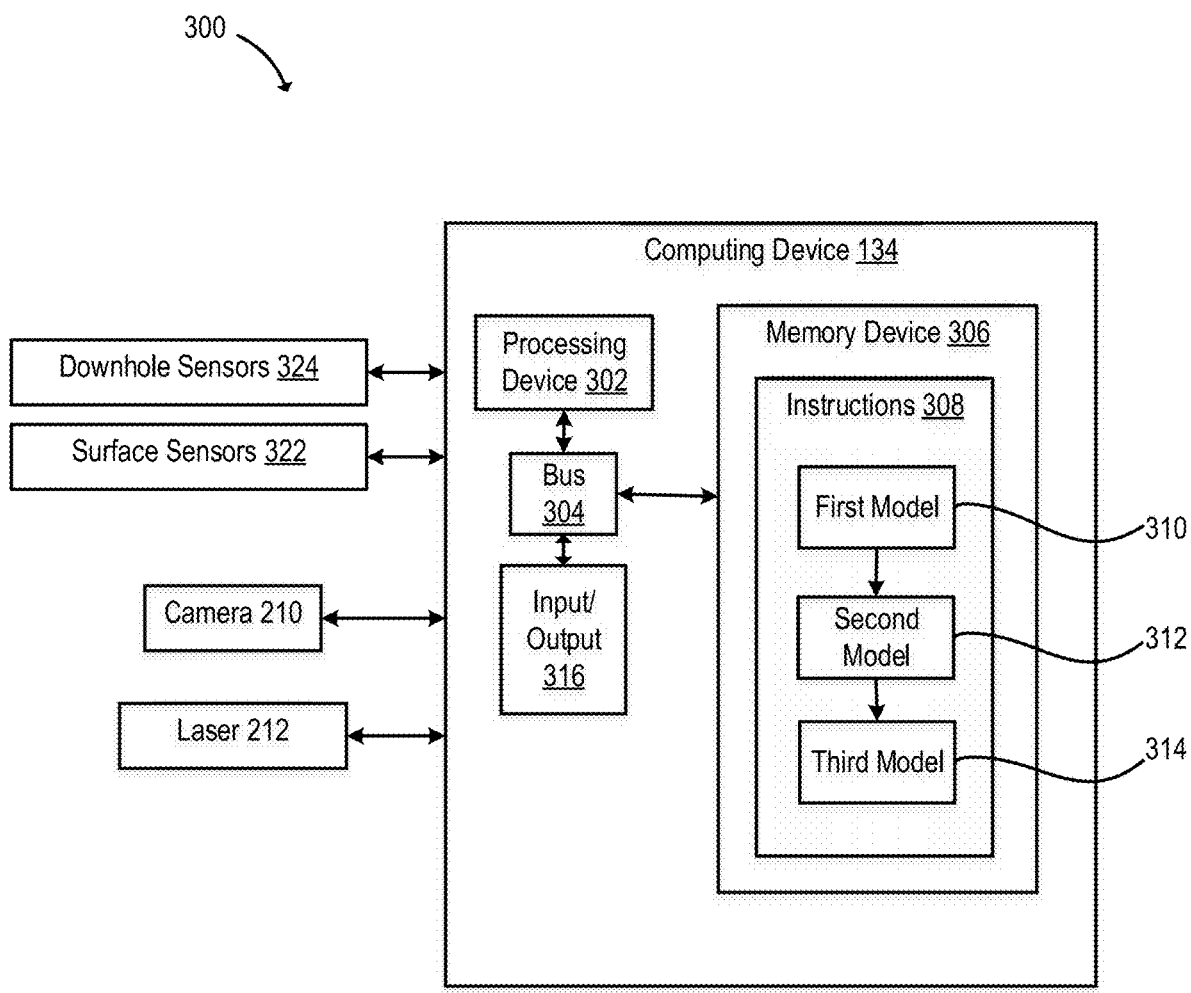
FIG. 3 is a block diagram of a system for detecting a downhole problem based on formation cuttings according to one example of the present disclosure.

FIG. 3 is a block diagram of a system for detecting a downhole problem based on formation cuttings according to one example of the present disclosure. The components shown in FIG. 2, such as a processing device 302 and memory device 306, may be integrated into a single structure, such as within a single housing of a computing device 301. Alternatively, the components shown in FIG. 3 can be distributed from one another and in electrical communication with each other.

The system 300 may include the computing device 301. The computing device 301 can include a processing device 302, a bus 304, and a memory device 306. The processing device 302 can execute one or more operations for detecting a downhole problem based on formation cuttings. The processing device 302 can execute instructions 308 stored in the memory device 306 to perform the operations. The processing device 302 can include one processing device or multiple processing devices or cores. Non-limiting examples of the processing device 302 include a Field-Programmable Gate Array ("FPGA"), an application-specific integrated circuit ("ASIC"), a microprocessor, etc.

The processing device 302 can be communicatively coupled to the memory device 306 via the bus 304. The non-volatile memory device 306 may include any type of memory device that retains stored information when powered off. Non-limiting examples of the memory device 306 may include EEPROM, flash memory device, or any other type of non-volatile memory device. In some examples, at least part of the memory device 306 can include a medium from which the processing device 302 can read instructions 308. A computer-readable medium can include electronic, optical, magnetic, or other storage devices capable of providing the processing device 302 with computer-readable instructions or other program code. Non-limiting examples of a computer-readable medium include (but are not limited to) magnetic disk(s), memory chip(s), ROM, RAM, an ASIC, a configured processing device, optical storage, or any other medium from which a computer processing device can read instructions 308. The instructions 308 can include processing-device specific instructions generated by a compiler or an interpreter from code written in any suitable computer-programming language, including, for example, C, C++, C#, etc.

The memory device 306 can include instructions 308 executable by the processing device 302 for detecting a problem downhole. The instructions 308 can include three software models 310, 312, 314 that are usable by the processing device 302 to perform various aspects of a process for detecting downhole problems. Examples of the models can include neural networks, classifiers (e.g., Naive Bayes classifiers), or other machine-learning models. It will be appreciated that although three models are shown in FIG. 3, this is for illustrative purposes and not intended to be limiting. Other examples may include more or fewer models capable of implementing some or all of the functionality described herein, and the present disclosure is not intended to be limited to a three-model implementation.

The processing device 302 can train the models 310, 312, 314 using training data that can be stored in databases (not pictured). In some examples, the training data for the first model can be a labeled image of a cutting with a box drawn around the cutting. The image may have been manually labeled by a human to identify formation cuttings therein. Each box can indicate a boundary of a cutting and each label can indicate a class of the formation cutting. In some examples, the training data for the first model can also include cutting properties (e.g., shape, size, material, height, volume, and/or perimeter data). In some examples, the training data for the second model can include characteristics of a subterranean formation, characteristics of or data from a well-tool (e.g., gamma ray information), historical data (e.g., lithology, geology, and mud rheology) of the region of a subterranean formation in which a drilling operation occurred, or any combination of these. In some examples, the training data for the second model can also include properties of formation cuttings and predefined downhole problems. In some examples, the training data for the third model can correlate predefined downhole problems to predefined solutions.

A camera 318 and a laser 320 can be communicatively coupled to the processing device 302 to provide images and laser data for use as inputs to the models 310, 312, 314. Additionally, surface sensors 322 positioned at a surface of a wellsite and downhole sensors 324 positioned downhole in a wellbore (e.g., on a well tool) can be communicatively coupled to the processing device 302 to provide additional data for use as inputs to the models 310, 312, 314. Examples of the downhole sensors 324 and surface sensors 322 can be temperature sensors, pressure sensors, or any other suitable types of sensors.

The processing device 302 can be communicatively coupled to the I/O device 316 via the bus 304. Examples of the I/O device 316 include a keyboard, a mouse, a display, and an audio device. The processing device 302 can output data from one or more of the software models 310, 312, 314 via the I/O device 316. Furthermore, the cuttings attribute findings outputted by the models 310, 312, 314 can be stored in an external database (not shown). In one example of the present disclosure, the I/O device 316 can display a monitoring dashboard. The monitoring dashboard can display inputs, or any of the outputs of the three models 310, 312, 314, generated by the processing device.

Figure 4:
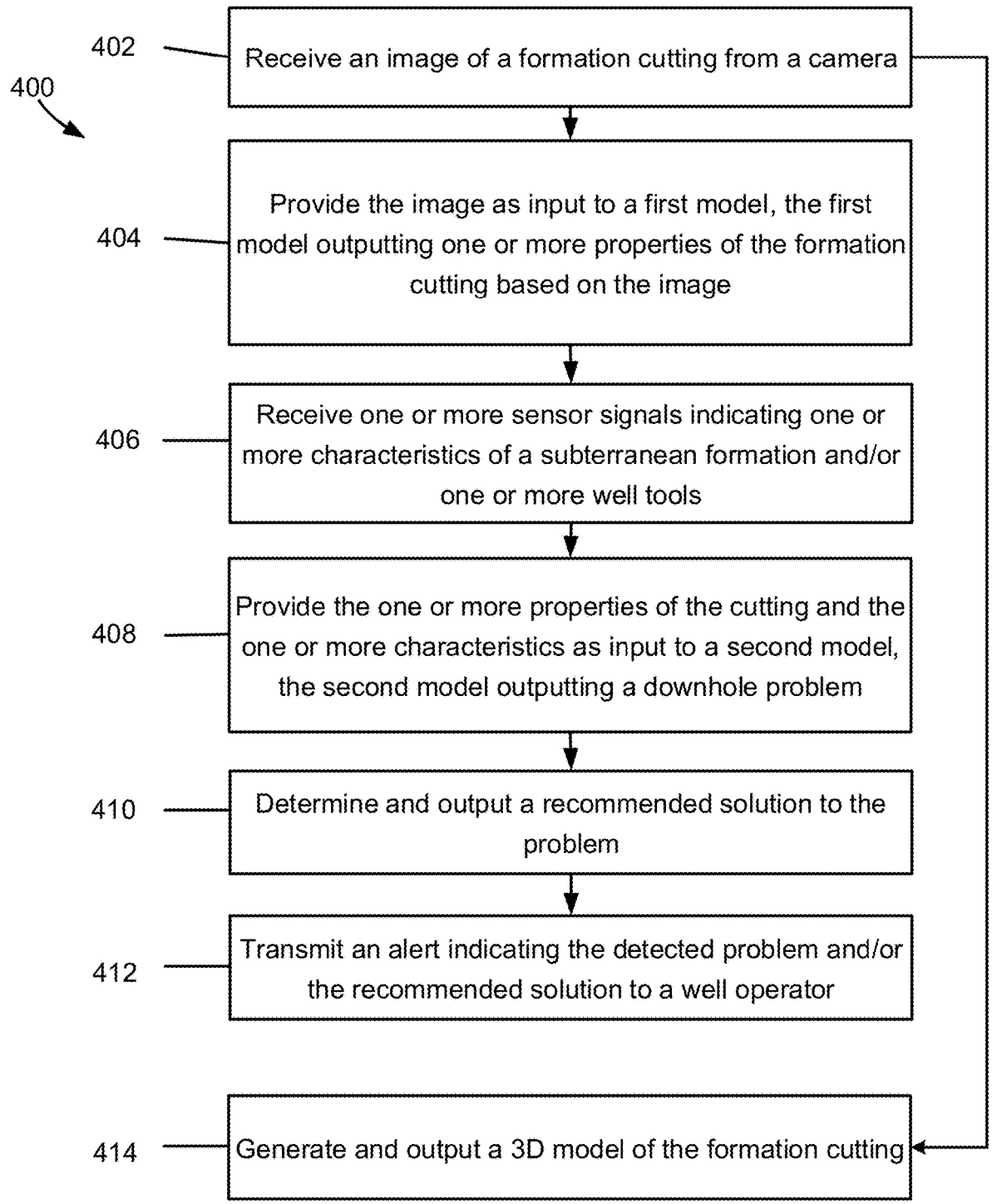
FIG. 4 is a flow chart of a process for detecting downhole problems by analyzing formation cuttings according to one example of the present disclosure.

In some examples, the processing device 302 can execute the operations described below with reference to FIG. 4. Other examples may include more, fewer, or different operations than those shown in FIG. 4. The operations of FIG. 4 are described below with reference to the components of FIG. 3 above.

At block 402, the processing device 302 can receive an image of a formation cutting from a camera 210. For example, the camera 210 can capture the image of the formation cutting and transmit the image via one or more networks (e.g., a local area network or the Internet) to the processing device 302.

At block 404, the processing device 302 can provide the image as input to a first model 310. The first model 310 can then determine and output properties of the formation cutting based on the image. For example, the first model may perform image processing operations such as smoothing, sharpening, and segmentation on the received image to detect a boundary of the cutting. After identifying the boundary of the cutting, the first model may analyze visual aspects of the cutting in the image to determine one or more properties of the cutting.

At block 406, the processing device 302 can receive one or more sensor signals indicating one or more characteristics of a subterranean formation from which the formation cutting was retrieved and/or one or more characteristics associated with one or more well tools (e.g., pumps, valves, drill strings, wireline tools, etc.). Exemplary characteristics of the subterranean formation can include a particular layer or depth of the formation, other positionality information, formation rock strength, presence of particle materials within formation, temperature, pore pressure, fluid pressure, mud weight, chemical composition, or time stamps for estimating a range of fracture. The characteristics of the subterranean formation may be provided by a well tool as RT or GR wireline data, downhole logs, etc. Exemplary characteristics of a well tool can include pump pressure, pump rate, torque, hook load, drill rate, or any combination of these. The processing device 302 can be communicatively coupled to the sensors (e.g., downhole sensors 324 or surface sensors 322) for receiving the sensor signals indicating the characteristics of the subterranean formation and/or the well tools. In some cases, the processing device 302 may receive additional real-time data from any of the additional sensors.

At block 408, the processing device 302 can provide the one or more properties of the cutting and the one or more characteristics as input to a second model. The second model can determine and output a downhole problem based on the one or more properties and the one or more characteristics.

Additionally or alternatively to the second model, in some examples the processing device 302 can use a lookup table to correlate properties of the cutting to predetermined downhole problems. The processing device 302 can correlate the properties of the cutting to symptoms of downhole problems to detect a particular downhole problem.

At block 410, the processing device 302 can determine and output a recommended solution to the problem. In some examples, the recommendation solution may contain one or more steps to be performed by a well operator at the wellsite or elsewhere for resolving the detected problem. To determine the recommended solution, in some examples the processing device 302 can use a lookup table to correlate downhole problems to solutions. In other examples, the processing device 302 can use a third model, such as a trained machine-learning model (e.g., a classifier), to determine a solution based on the detected problem.

At block 412, the processing device 302 can transmit an alert indicating the detected problem and/or the recommended solution to a well operator. For example, the processing device 302 can transmit an electronic alert over the Internet to a client device of the well operator. Examples of the client device may include a laptop computer, a desktop computer, a tablet, or a cellular telephone.

At block 414, the processing device 302 can generate and output a 3D model of the formation cutting. The processing device 302 can build the 3D model using one or more captured images from the camera and the data output by some or all of the models, such as the perimeter, height, surface properties, and volume of the formation cutting.

Figure 5:
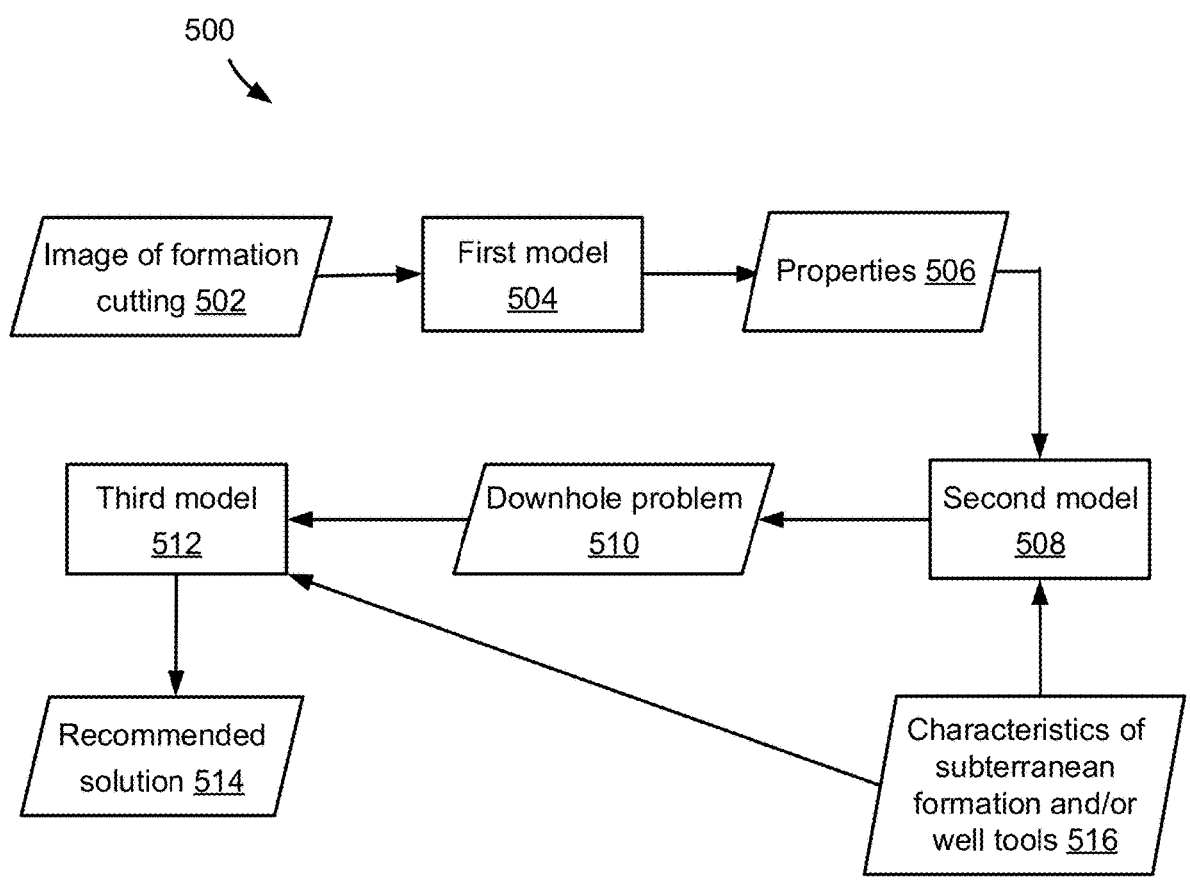
FIG. 5 is a data-flow diagram indicating inputs and outputs to software models for detecting a downhole problem by analyzing formation cuttings according to one example of the present disclosure.

FIG. 5 is a data-flow diagram indicating inputs and outputs to software models for detecting a downhole problem by analyzing formation cuttings according to one example of the present disclosure. Other examples may include more, fewer, or different operations than those shown in FIG. 5. The operations of FIG. 5 are described below with reference to the components of FIG. 3 above.

As shown, the processing device 302 provides an image 502 of a formation cutting as input to a first model 504. The image 502 can be a single image captured by a single camera 210 or can include multiple images captured by one or more cameras 210.

The first model 504 can receive as input the image 502 of the formation cutting. The first model can analyze the image 502 to distinguish the formation cutting from other content in the image 502 (e.g., the shaker belt, shaker screen, and extraneous material on the shaker belt other than the formation cutting). For example, the first model 504 may implement image segmentation and edge detection mechanisms to identify the formation cutting from the other content in the image 502. The first model 504 can then determine properties 506 of the formation cutting and output the properties 506. Examples of the properties 506 can include a type, a shape (e.g., angular or round), a size, a volume, a material (e.g., limestone or sand), or any combination of these for the formation cutting. The properties 506 may be output in any suitable format, such as a set of features configured to be input to another model. In some examples, the processing device 302 can store the properties in a database or an open standards repository, for example, the Open Subsurface Data Universe™ (OSDU) Forum, to ensure that they can run on any OSDU Data Platform architecture implementation.

In some examples, at least some of the properties 506 can be determined independently of the first model 504. For example, the processing device 302 can determine a height of the formation cutting based on laser data or multiple images of the formation cutting from a set of cameras. The processing device 302 can then incorporate the height into the properties 506 for input to the second model 508.

The properties 506 can be provided as one of several inputs to a second model 508, including data from downhole sensors 324 and surface sensors 322. Additional inputs to the second model 508 can include one or more characteristic(s) 516 of one or more well tool, one or more characteristic(s) 516 of a subterranean formation from which the formation cutting was retrieved, and/or include historical data (e.g., lithology, geology, and mud rheology) relating to the subterranean formation. The processing device 302 can supply the properties data 506 and/or the additional inputs as input to the second model 508. The second model 508 can include a machine-learning model configured to determine and output a downhole problem 510 based on the inputs. Examples of the downhole problem 510 can include a stuck pipe, a high pore-pressure, etc.

In some examples, the properties 506 can be provided as input in a mathematical representation of the properties, which can be correlated to one or more lookups of a detected downhole problem 510 or combination of downhole problems 510. Some of the properties 506 of the cutting may be clear indicators of a downhole problem 510 while others of the properties may be less clear indicators of a problem 510, and the properties 506 may be weighted based on their effectiveness. In some examples, the second model 512 can weight and select between a set of candidate problems to select a most likely problem(s) 510 to output to the user.

The processing device 302 can next supply the downhole problem 510 as input to the third model 512. The processing device 302 may also provide other inputs to the third model 512, such as some or all of the characteristics 516 described above. Based on the inputs, the third model 512 can output a recommended solution 514 to the downhole problem 510. The third model may be trained based on training data that includes historical information describing downhole problems, characteristics of subterranean formations and/or well tools, and actions applied to solve the problems. In some examples, the recommendation solution can include steps or information on how to resolve the detected problem. In some examples, the processing device may execute instructions for updating the problem and the solution in response to at least a part of one or more detected problems still occurring.

In some aspects, a system, method, apparatus for analyzing formation cuttings for detecting problems during a drilling operation are provided according to one or more of the following examples:

Example 1 is a system comprising: a camera coupleable to a shaker belt of a shaker screen for generating an image of a formation cutting extracted from a subterranean formation as a result of a drilling operation in a wellbore; one or more sensors that are separate from the camera, the one or more sensors being positionable to detect one or more characteristics of the subterranean formation or a well tool and transmit one or more sensor signals indicating the one or more characteristics; a processing device communicatively coupleable to the camera and the sensor; and a memory device that includes instructions executable by the processing device for causing the processing device to: receive the image from the camera and the one or more sensor signals from the one or more sensors; provide the image as input to a first model, the first model being configured to determine and output one or more properties of the formation cutting based on the image; provide the one or more properties and the one or more characteristics as input to a second model, the second model being configured to detect and output a problem associated with the drilling operation based on the one or more properties of the formation cutting and the one or more characteristics; based on determining the problem, determine a recommended solution to the problem; and transmit an alert indicating the problem and the recommended solution to a well operator.

Example 2 is the system of example 1, wherein a sensor of the one or more sensors is located on a downhole tool configured for use downhole in the wellbore, and wherein the one or more characteristics include an intrinsic property of the subterranean formation.

Example 3 is the system of any of examples 1-2, wherein a sensor of the one or more sensors and the well tool are positionable at a well surface, and wherein the one or more characteristics include a setting of the well tool.

Example 4 is the system of any of examples 1-3, wherein the first model is a machine-learning model, and wherein the memory device further includes instructions that are executable by the processing device for causing the processing device to train the machine-learning model based on training data containing labeled images defining boundaries of formation cuttings from one or more subterranean formations.

Example 5 is the system of any of examples 1-4, wherein the memory device further includes instructions that are executable by the processing device for causing the processing device to: detect damage to the shaker belt or an overflow condition on the shaker belt by analyzing one or more images from the camera; and output a notification indicating the damage or the overflow condition, respectively.

Example 6 is the system of any of examples 1-5, wherein the memory device further includes instructions that are executable by the processing device for causing the processing device to: determine a height of the formation cutting based on data from a laser or another image from another camera; and provide the height of the formation cutting as input to the second model, the second model being configured to determine the problem based on the height.

Example 7 is the system of any of examples 1-6, wherein the one or more properties of the formation cutting include a material, a shape, and a volume of the formation cutting.

Example 8 is the system of any of examples 1-7, wherein the second model is a machine-learning model, and wherein the memory device further includes instructions executable by the processing device for causing the processing device to train the machine-learning model based on training data that correlates (i) cutting properties to (ii) predefined problems associated with drilling operations.

Example 9 is the system of any of examples 1-8, wherein the memory device further includes instructions that are executable by the processing device for causing the processing device to determine the recommended solution to the problem by using a lookup table that correlates wellbore problems to solutions.

Example 10 is the system of any of examples 1-9, wherein the memory device further includes instructions that are executable by the processing device for causing the processing device to determine the recommended solution by supplying the problem and the one or more characteristics as input to a third model, the third model being configured to determine the recommended solution based on the problem and the one or more characteristics.

Example 11 is the system of any of examples 1-10, wherein the memory device further includes instructions that are executable by the processing device for causing the processing device to: generate a three-dimensional model of the formation cutting based on the image; and output the three-dimensional model on a display device for the well operator.

Example 12 is a method comprising: receiving, by a processing device, an image from a camera oriented toward a shaker belt of a shaker screen, the image depicting a formation cutting extracted from a subterranean formation as a result of a drilling operation in a wellbore; receiving, by the processing device, one or more sensor signals from one or more sensors indicating one or more characteristics of the subterranean formation or a well tool; providing, by the processing device, the image as input to a first model, the first model being configured to determine and output one or more properties of the formation cutting based on the image; providing, by the processing device, the one or more properties and the one or more characteristics as input to a second model, the second model being configured to detect and output a problem associated with the drilling operation based on the one or more properties of the formation cutting and the one or more characteristics; based on determining the problem, determine, by the processing device, a recommended solution to the problem; and transmitting, by the processing device, an alert indicating the problem and the recommended solution to a well operator.

Example 13 is the method of example 12, wherein the first model is a machine-learning model, and further comprising training the machine-learning model based on training data containing labeled images defining boundaries of formation cuttings from one or more subterranean formations.

Example 14 is the method of any of examples 12-13, further comprising: detecting damage to the shaker belt or an overflow condition on the shaker belt by analyzing one or more images from the camera; and outputting a notification indicating the damage or the overflow condition, respectively.

Example 15 is the method of any of examples 12-14, further comprising: determining a height of the formation cutting based on data from a laser or another image from another camera; and providing the height of the formation cutting as input to the second model, the second model being configured to determine the problem based on the height.

Example 16 is the method of any of examples 12-15, further comprising detecting the recommended solution by supplying the problem and the one or more characteristics as input to a third model, the third model being configured to determine and output the recommended solution based on the problem and the one or more characteristics.

Example 17 is the method of any of examples 12-16, wherein the second model is a machine-learning model, and further comprising training the machine-learning model based on training data that correlates (i) cutting properties to (ii) predefined problems associated with drilling operations.

Example 18 is the method of any of examples 12-17, further comprising: determining the recommended solution to the problem by using a lookup table that correlates wellbore problems to solutions; and outputting the recommended solution to the well operator.

Example 19 is the method of any of examples 12-18, wherein the shaker belt and the shaker screen are parts of a shaker, and further comprising: generating, based on images from the camera and another camera, a virtual reality environment or an augmented reality environment that depicts a three-dimensional model of content on the shaker; and outputting the three-dimensional model on a display device to a user.

Example 20 is a non-transitory computer-readable medium comprising program code that is executable by a processing device for causing the processing device to: receive an image from a camera, the image depicting a formation cutting extracted from a subterranean formation as a result of a drilling operation in a wellbore; receive one or more sensor signals from one or more sensors indicating one or more characteristics of the subterranean formation or a well tool; provide the image as input to a first model, the first model being configured to determine and output one or more properties of the formation cutting based on the image; provide the one or more properties and the one or more characteristics as input to a second model, the second model being configured to detect a problem associated with the drilling operation based on the one or more properties of the formation cutting and the one or more characteristics; and transmit an alert indicating the problem to a well operator.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a camera coupleable to a shaker belt of a shaker screen for generating an image of a formation cutting extracted from a subterranean formation as a result of a drilling operation in a wellbore;
one or more sensors that are separate from the camera, the one or more sensors being positionable to detect one or more characteristics of the subterranean formation or a well tool and transmit one or more sensor signals indicating the one or more characteristics;
a processing device communicatively coupleable to the camera and the sensor; and
a memory device that includes instructions executable by the processing device for causing the processing device to:
receive the image from the camera and the one or more sensor signals from the one or more sensors;
provide the image as input to a first model, the first model being configured to determine and output one or more properties of the formation cutting based on the image;
provide the one or more properties and the one or more characteristics as input to a second model, the second model being configured to detect and output a problem associated with the drilling operation based on the one or more properties of the formation cutting and the one or more characteristics;
based on determining the problem, determine a recommended solution to the problem by supplying the problem and the one or more characteristics as input to a third model, the third model being configured to determine the recommended solution based on the problem and the one or more characteristics; and
transmit an alert indicating the problem and the recommended solution to a well operator.

2. The system of claim 1, wherein a sensor of the one or more sensors is located on a downhole tool configured for use downhole in the wellbore, and wherein the one or more characteristics include an intrinsic property of the subterranean formation.

3. The system of claim 1, wherein a sensor of the one or more sensors and the well tool are positionable at a well surface, and wherein the one or more characteristics include a setting of the well tool.

4. The system of claim 1, wherein the first model is a machine-learning model, and wherein the memory device further includes instructions that are executable by the processing device for causing the processing device to train the machine-learning model based on training data containing labeled images defining boundaries of formation cuttings from one or more subterranean formations.

5. The system of claim 1, wherein the memory device further includes instructions that are executable by the processing device for causing the processing device to:
detect damage to the shaker belt or an overflow condition on the shaker belt by analyzing one or more images from the camera; and
output a notification indicating the damage or the overflow condition, respectively.

6. The system of claim 1, wherein the memory device further includes instructions that are executable by the processing device for causing the processing device to:
determine a height of the formation cutting based on data from a laser or another image from another camera; and
provide the height of the formation cutting as input to the second model, the second model being configured to determine the problem based on the height.

7. The system of claim 1, wherein the one or more properties of the formation cutting include a material, a shape, and a volume of the formation cutting.

8. The system of claim 1, wherein the second model is a machine-learning model, and wherein the memory device further includes instructions executable by the processing device for causing the processing device to train the machine-learning model based on training data that correlates (i) cutting properties to (ii) predefined problems associated with drilling operations.

9. The system of claim 1, wherein the memory device further includes instructions that are executable by the processing device for causing the processing device to determine the recommended solution to the problem by using a lookup table that correlates wellbore problems to solutions.

10. The system of claim 1, wherein the third model is a machine-learning model, and wherein the memory device further includes instructions executable by the processing device for causing the processing device to train the machine-learning model based on training data to output one or more steps to perform to implement the recommended solution.

11. The system of claim 1, wherein the memory device further includes instructions that are executable by the processing device for causing the processing device to: generate a three-dimensional model of the formation cutting based on the image; and output the three-dimensional model on a display device for the well operator.

12. A method comprising:
receiving, by a processing device, an image from a camera oriented toward a shaker belt of a shaker screen, the image depicting a formation cutting extracted from a subterranean formation as a result of a drilling operation in a wellbore;
receiving, by the processing device, one or more sensor signals from one or more sensors indicating one or more characteristics of the subterranean formation or a well tool;
providing, by the processing device, the image as input to a first model, the first model being configured to determine and output one or more properties of the formation cutting based on the image;
providing, by the processing device, the one or more properties and the one or more characteristics as input to a second model, the second model being configured to detect and output a problem associated with the drilling operation based on the one or more properties of the formation cutting and the one or more characteristics;
based on determining the problem, determine, by the processing device, a recommended solution to the problem using a trained model; and
transmitting, by the processing device, an alert indicating the problem and the recommended solution to a well operator.

13. The method of claim 12, wherein the first model is a machine-learning model, and further comprising training the machine-learning model based on training data containing labeled images defining boundaries of formation cuttings from one or more subterranean formations.

14. The method of claim 12, further comprising:
detecting damage to the shaker belt or an overflow condition on the shaker belt by analyzing one or more images from the camera; and
outputting a notification indicating the damage or the overflow condition, respectively.

15. The method of claim 12, further comprising:
determining a height of the formation cutting based on data from a laser or another image from another camera; and
providing the height of the formation cutting as input to the second model, the second model being configured to determine the problem based on the height.

16. The method of claim 12, further comprising detecting the recommended solution by supplying the problem and the one or more characteristics as input to the trained model, the trained model being a third model that is configured to determine and output the recommended solution based on the problem and the one or more characteristics.

17. The method of claim 12, wherein the second model is a machine-learning model, and further comprising training the machine-learning model based on training data that correlates (i) cutting properties to (ii) predefined problems associated with drilling operations.

18. The method of claim 12, further comprising:
determining the recommended solution to the problem by using a lookup table that correlates wellbore problems to solutions; and
outputting the recommended solution to the well operator.

19. The method of claim 12, wherein the shaker belt and the shaker screen are parts of a shaker, and further comprising:
generating, based on images from the camera and another camera, a virtual reality environment or an augmented reality environment that depicts a three-dimensional model of content on the shaker; and
outputting the three-dimensional model on a display device to a user.

20. A non-transitory computer-readable medium comprising program code that is executable by a processing device for causing the processing device to:
receive an image from a camera, the image depicting a formation cutting extracted from a subterranean formation as a result of a drilling operation in a wellbore;
receive one or more sensor signals from one or more sensors indicating one or more characteristics of the subterranean formation or a well tool;
provide the image as input to a first model, the first model being configured to determine and output one or more properties of the formation cutting based on the image;
provide the one or more properties and the one or more characteristics as input to a second model, the second model being configured to detect and output a problem associated with the drilling operation based on the one or more properties of the formation cutting and the one or more characteristics;
based on detecting the problem, determine a recommended solution to the problem using a trained model, wherein the trained model is configured to determine and output the recommended solution based on the problem and the one or more characteristics; and
transmit an alert indicating the problem to a well operator.

* * * * *